United States Patent [19]

Whitlock

[11] Patent Number: 4,983,784

[45] Date of Patent: Jan. 8, 1991

[54] CABLE TERMINATION APPARATUS AND METHOD

[76] Inventor: Ronald K. Whitlock, 19922-70th Avenue, Langley, British Columbia, Canada, V3A 4P 7

[21] Appl. No.: 343,376

[22] Filed: Apr. 26, 1989

[30] Foreign Application Priority Data

May 13, 1988 [AU] Australia .............................. PI8217

[51] Int. Cl.⁵ ............................................ F16L 41/00
[52] U.S. Cl. .................... 174/65 SS; 285/161
[58] Field of Search ............... 174/65 SS, 78; 285/161

[56] References Cited

U.S. PATENT DOCUMENTS

| | | | |
|---|---|---|---|
| 3,188,380 | 6/1965 | Lorenz | 174/75 |
| 3,285,551 | 11/1966 | Tschanz | 248/56 |
| 3,515,798 | 6/1970 | Sievert | 174/135 |
| 4,029,895 | 6/1977 | Scarborough | 174/138 F |
| 4,195,895 | 4/1980 | Ziegler | 439/99 |
| 4,358,079 | 11/1982 | Navarro | 248/56 |
| 4,389,440 | 6/1983 | Keith | 428/34.9 |
| 4,440,425 | 4/1984 | Pate et al. | 285/161 |

Primary Examiner—Leo P. Picard
Assistant Examiner—David A. Tone
Attorney, Agent, or Firm—Shlesinger & Myers

[57] ABSTRACT

The invention permits a cable to be connected to an item with an opening or threaded hub, for example a junction box. The invention can accommodate a wide range of cable sizes and enables an operator to quickly form an effectively water-tight and gas-tight connection with the junction box, thus sealing the junction box from contaminants. The apparatus of the invention has an opening for receiving the cable and a plurality of flexible fingers extending peripherally around the cable. An elastic cover assembly encloses the fingers and comprises an elastic sleeve enclosing a hollow core member. Initially, the sleeve is stretched on the hollow core member, which member is then progressively removed to permit the sleeve to collapse onto the fingers to force the fingers against the cable, enhancing gripping of the cable. A shoulder adjacent the fingers and projections on the fingers enhances grip of the sleeve.

19 Claims, 2 Drawing Sheets

CABLE TERMINATION APPARATUS AND METHOD

BACKGROUND OF THE INVENTION

The invention relates to an apparatus and method for terminating a cable at an item, for example a junction box, to provide a sealed connection therewith.

In many applications it is desired to terminate an electrical cable at a junction box, and to prevent contamination of the interior of the junction box by sealing the cable where it enters the junction box.

There are two main types of seals for cables passing into junction boxes, namely a seal for a cable which passes through a rigid metal conduit, and a seal for cables which are not within conduits and are relativelY flexible and have at least a flexible protective sleeve. A rigid conduit can usually be sealed in the junction box with conventional 0-rings and threaded connections, and the cable can pass through the conduit and opening in the box without requiring additional sealing on the cable. The present invention is particularly directed to cables having flexible sleeves, such as elastomeric sleeves, or flexible metal armoured sheaths and means of sealing such a cable with a junction box or other item having an opening.

U.S. Pat. Nos. 3,188,380 (Lorenz), 3,285,551 (Tschanz) and 4,358,079 (Navarro) disclose connecting devices associated with an opening of an item, such as a junction box. These devices provide a fluid resistant seal with the cable, and grip the cable compressively to prevent relative movement between the box and cable. In some instances, the grip is sufficient to relieve the electrical conductors within the cable from load when secured to terminals within the box. Such devices have a hollow body which cooperates with the opening, the body having a threaded male portion which receives a threaded hollow cap which is tightened to squeeze onto the cable. These known devices are manufactured for a particular nominal diameter of cable, and can only accommodate small variations from the nominal cable diameter. Consequently, if a wide range of sizes of cattles are to be installed, a corresponding wide range of diameters of connecting devices is required. Furthermore, use of a threaded hollow cap to be screwed onto a body member secured to the item is time consuming and requires care and skill. Under-tightening of the cap car result in leakage through the seal into the box, and over-tightening can result in damage to the assembly, particularly when the cap is fabricated from plastic or other resilient material.

U.S. Pat. Nos. 3,515,798 (Sievert) and 4,389,440 (Keith), both of which are owned by the Minnesota Mining and Manufacturing Company, disclose an elastic cover assembly comprising an elastic cover or sleeve which is sold in an initially stretched condition in which it encloses a removeable rigid spiral core assembly. The spiral core assembly is used as a tool to apply the elastic cover as an insulating sleeve to an electrical cable splice, or other joint between two generally cylindrical workpieces. To apply the cover, the rigid spiral core is uncoiled as a continuous narrow strip through a remaining portion of the spiral core assembly which permits the stretched elastic cover to shrink-fit upon the workpiece joint within the assembly. Both of these last two mentioned patents provide a seal for connected cables or other aligned workpieces.

SUMMARY OF THE INVENTION

The invention provides an apparatus for connecting a cable to an item having an opening, such as connecting an electrical cable to a junction box in which the said elastic cover assembly, as patented by the Minnesota Mining and Manufacturing Company, is used to enhance gripping of the item to the cable, as well as providing a seal between the cable and item to resist environmental contamination. Use of the patented elastic cover assembly provides a connecting apparatus which can accommodate a wide range of electrical cable sizes when compared with the prior art connecting devices, and permits a low cost connection which can be quickly installed by an unskilled operator.

The apparatus according to the invention comprises a body having aligned first and second portions having respective outer peripheries. The first and second portions have axially aligned openings for receiving a cable passed therethrough. The first portion has a plurality of flexible fingers disposed on the periphery thereof to extend around the cable. An elastic cover assembly is positionable on the body to enclose at least the fingers of the first portion and comprises an elastic sleeve and a hollow core member. The sleeve is initially supported in a stretched condition on the hollow core member which is removeable to permit the sleeve to collapse onto the fingers. The fingers are disposed generally parallel to an axis of the opening and are circumferentially spaced apart around the periphery of the first portion sufficiently to provide clearance therebetween to permit the fingers to deflect inwardly to engage the cable. The fingers have inner faces, and at least one of the fingers has cable engaging means projecting inwardly from the inner faces for enhancing gripping of the cable. When the elastic sleeve is installed on the cable after removal of the hollow core member from the elastic core assembly, the sleeve forces the cable engaging means against the cable. Also, preferably at least one of the fingers has sleeve engaging means projecting outwardly from an outer surface of the fingers for enhancing gripping of the sleeve. When the sleeve is installed on the cable after removal of the hollow core member, the elastic cover assembly is deformed by the sleeve engaging means.

A method according to the invention is for connecting a cable to an item having an opening. The method includes the steps of:

providing a device having a body with aligned first and second portions having respective outer peripheries, the first and second portions having axially aligned openings for receiving the cable therethrough, the first portion having a plurality of flexible fingers disposed on the periphery thereof, passing the second portion of the body through the opening of the item, and securing the body to the item, positioning an elastic cover assembly so as to enclose at least the fingers of the first portion, the cover assembly comprising an elastic sleeve and a hollow core member, the sleeve initially being supported in a stretched condition on the hollow core member, passing the cable through the cover assembly and the openings of the first and second portions so that the cable extends between the fingers, removing the hollow core member to permit the sleeve to collapse onto the first portion, thereby forcing the fingers against the cable.

A detailed disclosure following, relating to drawings, provides a preefrred apparatus and method according to the invention, which is capable of expression in apparatus and method other than those described and illustrated.

DETAILED DISCLOSURE

FIGS. 1 through 4

Figure 1:
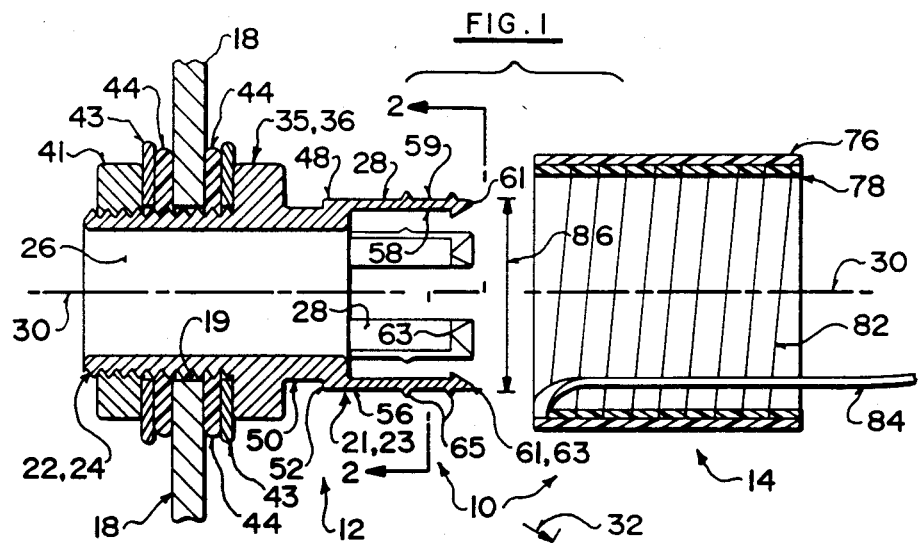
FIG. 1 is a simplified fragmented sectional view, as seen on an essentially vertical diametrical plane, of two main components of the apparatus prior to assembly, portions of a junction box being shown.

A cable termination apparatus 10 according to the invention is shown as two separated main components prior to installation, and includes a body 12 and an elastic cover assembly 14. The apparatus is for connecting a cable 16 having a resilient cover 17, which is shown in broken outline in FIG. 3 only, to an item. The item can be a wall 18 of a junction box, the wall having an opening 19 to receive the apparatus and cable passed therethrough. While the invention is primarily described for securing an electrical cable to a junction box, other cables, such as optical cables, hoses, hydraulic, pneumatic or other conduits can be secured to any item with an appropriate opening. The opening 19 can be threaded, as in a threaded hub.

Figure 2:
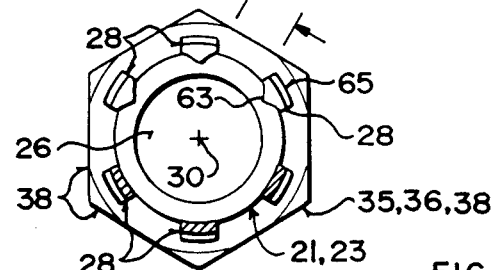
FIG. 2 is a cross-section of one of the components, as seen on line 2—2 of FIG. 1.

The body 12 has aligned first and second portions 21 and 22 having respective first and second peripheries 23 and 24. The portions have axially aligned openings which provide a common bore 26 for receiving the cable 16 passed therethrough. The first portion has a plurality of flexible fingers severally 28 disposed on the periphery thereof to extend around the cable. As seen in FIG. 2, six fingers 28 are shown, but clearly more or less fingers could be selected depending on the relative diameter of the cable, thickness of the body., size of the fingers etc. The fingers are disposed generally parallel to an axis 30 of the openings, and are circumferentially spaced apart around the periphery 23 of the first portion sufficiently to provide a peripheral clearance 32 between adjacent fingers. The peripheral clearance permits the fingers to deflect inwardly to engage the cable as will be described with reference to FIGS. 4 and 7.

The body also has a third portion 35 disposed between and preferably integral with the first and second portion thereof, the third portion having an opening axially aligned with the openings of the first and second portions to receive the cable passed therethrough. The third portion has a third periphery 36, which preferably has six flats 38 thereon to provide a conventional hexagonal nut to receive a conventional wrench for applying torque to the body 12 as will be described.

The second periphery 24 of the second portion is screw-threaded to receive a nut 41, which secures the body to the wall of the junction box 18. Conventional washers 43 and resilient sealing gaskets 44 are provided between the nut 41 and third portion 35 to ensure a fluid tight vibration resistant connection between the body and the junction box.

The first portion 21 of the body has a rim portion 48 and a waist portion 50, and the fingers extend axially from the rim portion as best seen in FIG. 1. The waist portion has a diameter smaller than that of the rim portion to define an annular shoulder 52 therebetween. It can be seen that the shoulder 52 is disposed generally adjacent inner ends 56 of the fingers, which are located adjacent the rim portion 48.

The fingers have inner and outer faces 58 and 59 respectively and outer ends 61. The outer ends of the fingers include barb means 63 located so as to extend inwardly from the inner faces 58 of the fingers and resilience of the fingers permits the fingers to be deformed inwardly so that the barb means 63 engage the cable 16. Thus the barb means serve as cable engaging means which project inwardly from the inner surface of the finger and enhance gripping of the cable when the fingers are urged inwardly as will be described. The outer faces 59 of the fingers include respective pairs of axially spaced projections 65 projecting outwardly from the outer surface of the fingers. Preferably the barb means 63 and projections 65 are provided on all fingers as shown, but could be provided on fewer fingers.

The elastic cover assembly 14 is a known item used for installing shrinkable tubular cover members or protective sleeves over electrical cable splices, welded pipe joints, etc. In particular, the elastic cover assembly 14 can be of the type shown in U.S. Pat. Nos. 3,515,798 (Inventor: James A. Sievert) or 4,389,440 (Inventor: Roger H. Keith), both owned by the Minnesota Mining and Manufacturing Company of St. Paul, MN. The structure of the elastic cover assembly 14 can be identical to that as shown in either of the patents, the disclosures of which are incorporated by reference herein.

Figure 3:
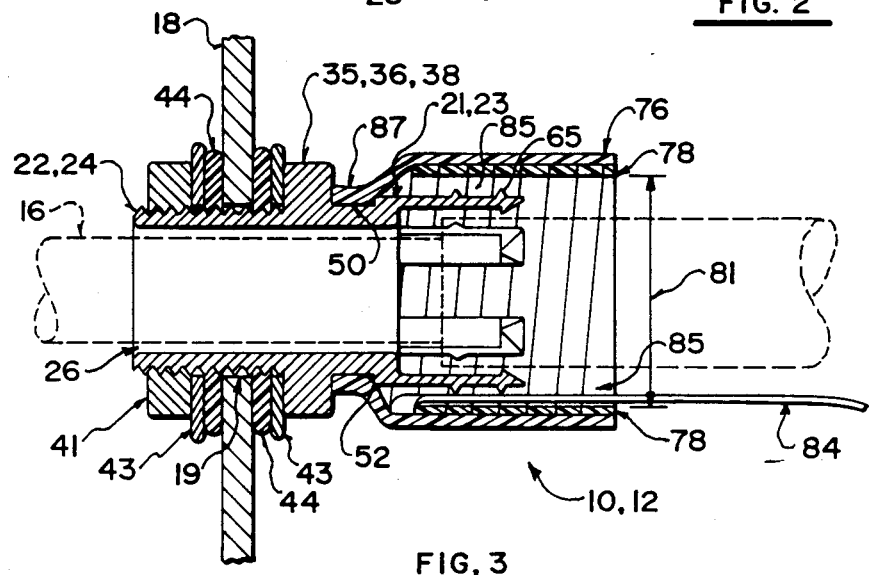
FIG. 3 is a simplified fragmented sectional view generally similar to FIG. 1, showing relative disposition of the components in a preliminary installation stage, and portions of an electrical cable.
Figure 4:
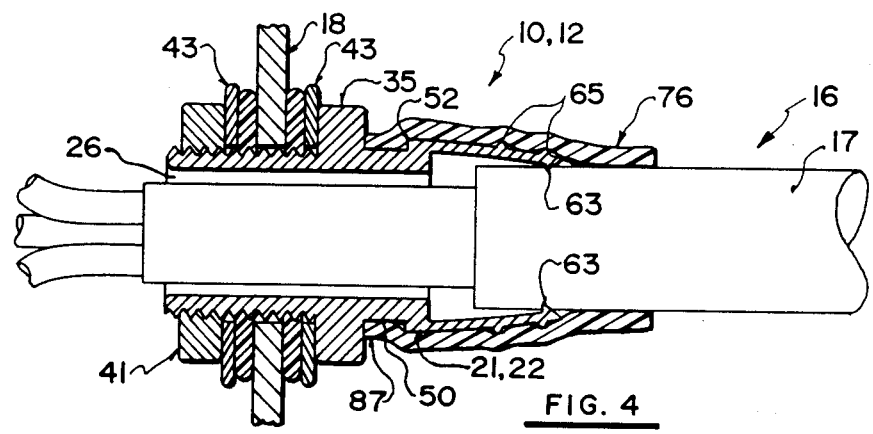
FIG. 4 is a view generally similar to FIG. 3, showing the components and cable in a final installation stage.

Briefly, the elastic cover assembly 14 comprises an elastic sleeve 76 and a hollow core member 78. The elastic sleeve 76 is initially supported in a stretched condition on the core member and may be formed of compounded synthetic rubbers or other elastomers, examples of which include neoprene, silicone elastomers or ethylene propylene copolymers. The hollow core member 78 comprises a unitary tubular shell which is helically grooved along its entire length with a continuous groove 82. The groove effectively produces a separable helical strip which permits the shell to be sequentially removed from one end thereof by pulling out a continuous strip 84 which is removed through remaining portions of the sheath, that is from an annular space 85 disposed between the shell, the first portion 21 and the cable 16. The hollow core member 78 has a bore diameter 81 which is greater than a maximum spacing 86 across diametrically opposed fingers 28 of the first portion of the body to provide the annular space 85 for removal of the helical strip. As the strip is progressively withdrawn, the sleeve correspondingly contracts about the cable as will be described, to form a closely conforming and tightly retained protective cover as seen in FIG. 4. FIG. 3 shows an initial configuration in which an end portion 87 of the sleeve is retained in the waist portion 50 of the body.

As indicated in the patents, initially the elastic sleeve 76 is expanded or stretched by the cover to afford a stretch ratio of 1 to 1.2 (1:1.2) through to 1 to 4 (i.e. 1:4). The sleeve is initially supported in the stretched condition within the ratios above.

OPERATION

The description following is for securing an end of the cable 16 to the apparatus 10 which is secured to a junction box, but clearly the invention could be employed in equivalent areas.

After first passing a washer 43 and resilient gasket 44 onto the second portion 22 of the body, the second portion is passed through the opening 19 of the item and secured to the item using a further resilient gasket 44 and washer 43 in combination with the nut 41. A length of elastic sleeve can either have been previously installed on the first portion 21 of the apparatus, or it can be installed at this stage. The sleeve has a length selected to extend from the waist portion 50 to about one centimeter beyond outer ends of the fingers 28. To simplify some installations, it is desirable to have an end portion of the sleeve partiallY collapsed into the waist portion 50 as shown in FIG. 3, by initially withdrawing a portion of the continuous strip 54 of the core member which is adjacent the third portion of the body 35. This permits the end portion 87 of the sleeve 76 to collapse into the waist portion 50 to locate the sleeve relative to the body. The end of the cable 16 is now passed through the openings of the apparatus, or it could have been passed through earlier if the sleeve had been previously partially collapsed. Preferably, the wires within the cable are now connected to the requisite terminals, not shown, so that the sheath of the cable is at a final location relative to the apparatus.

The strip 84 is now pulled carefully from inside the cover assembly, which results in the hollow core member 78 being progressively removed from inside the sleeve 76 to permit the elastic sleeve 76 to collapse progressively onto the first portion of the apparatus, thereby forcing the fingers 28 against the cable. Clearly, as the strip is withdrawn, the core progressively collapses starting at the end portion 87, i.e. at a position remote from the outer ends of the fingers, so that the adjacent portions of the sleeve collapse sequentially onto the fingers in a direction towards the outer ends of the fingers. As seen in FIG. 4, when the core has been removed totally, the barb means 63 are forced into the resilient cover 17 of the cable by the inwards force generated by the sleeve 76, which is stretched to some extent even when collapsed. It can be seen that when the elastic sleeve is installed on the cable after complete removal of the hollow core members the barb means 63, serving as cable engaging means, are forced against the cable, thus enhancing gripping of the cable.

Furthermore, because the projections 65 extend outwardly from the fingers, when the sleeve 76 is completely installed on the cattle after removal of the hollow core member, the sleeve is deformed outwardly by the projections 65. Thus, it can be seen that the projections 65 serve as sleeve engaging means which are provided on, and project outwardly from, outer surfaces of the fingers. When the sleeve has collapsed onto the projections 65, the sleeve is deformed so as to enhance grip between the sleeve and the fingers.

It can be seen that the elastic sleeve 76 has the end portion 87 received in the waist portion 50 of the body in a reduced stretched condition, and passes over the shoulder 52 onto the rim portion 48, in an increased stretched condition, thus deforming the sleeve and enhancing grip of the sleeve on the first portion.

ALTERNATIVES

If the electrical cable 16 has a metallic sheath fitted beneath the resilient cover 17, it is usual to provide an electrical connection between the sheath and the junction box or other item to provide electrical grounding of the sheath. If this is required, an essentially rigid contact spike or member can be inserted into the cable and is held there by a combination of the natural resilience of the resilient cover 17, augmented by gripping of the cable due to force from the collapsed sleeve 76 as follows.

Figures 5, 6:
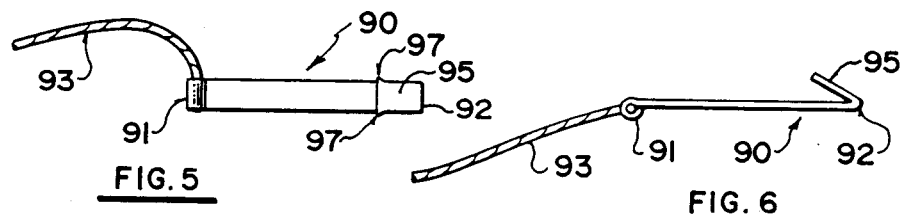
FIG. 5 is a simplified fragmented top plan of a contact means for electrically grounding a metallic sheath of a cable.
FIG. 6 is a simplified fragmented side view of the contact means of FIG. 5.
Figure 7:
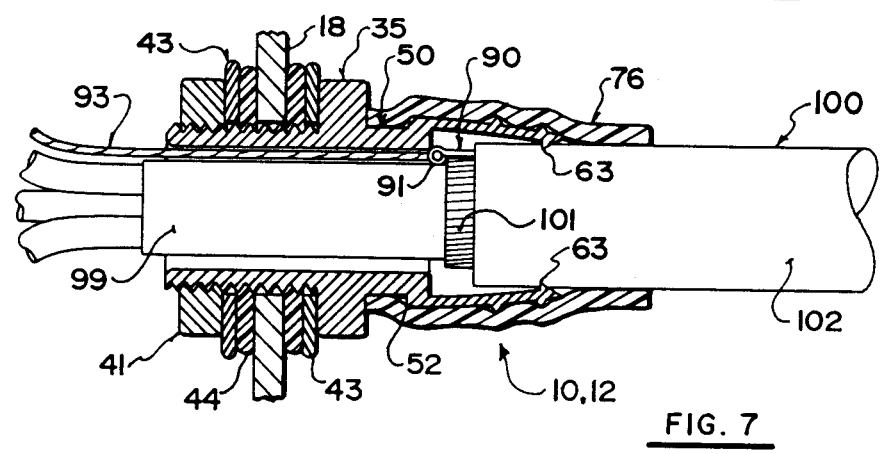
FIG. 7 is a view generally similar to FIG. 4, showing in addition an electrical contact means installed to provide grounding for an armoured or metallic sheath of an armoured cable.

FIGS. 5 through 7

A ground contact member 90 has an inner end 91 connected to a length of electrical wire 93, and an outer end 92 having a barb means 95. The member 90 is formed from a flat, parallel sided metal strip and the outer end 92 is bent around through approximately 150 degrees, as seen in FIG. 6, to form the barb means 95. Preferably, opposite corners 97 of the barb means project outwardly as shown to serve additional barb means.

Referring to FIG. 7, an alternative cable 100 has an inner sleeve 99, which is enclosed by a metallic or armoured sheath 101, which is usually braided wire and is generally adjacent and enclosed by an outer resilient cover 102 of the cable. Before collapsing the sleeve 76, the ground contact member 90 is forced inwardly along the cable and between the sheath 101 and cover 102, which causes the cover to deform, permitting the barb and contact member to pass inwardly until the inner end 91 is closely adjacent the end of the cover 102. Clearly, if an attempt were made to pull the contact member 90 outwardly, the barb means 95 and its opposite corners 97 would tend to strongly engage the cover, resisting withdrawal of the contact means.

Figures 8, 9:
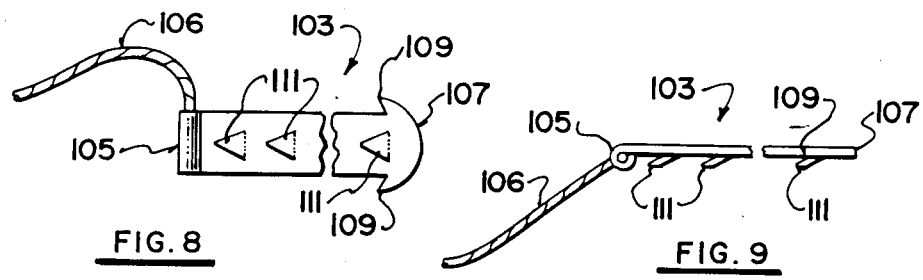
FIG. 8 is a simplified fragmented top plan of an alternative contact means of the invention.
FIG. 9 is a simplified side view of the contact means of FIG. 8.

FIGS. 8 and 9

An alternative ground contact member 103 is shown which is used in a similar manner. The ground member 103 has an inner end 105 connected to a wire 106, and an outer end 107 having a generally arrowhead shape with a pair of oppositely facing head barb means 109, which are adapted to engage the resilient cover 102 of the cable. The member 103 has a plurality of axially aligned body barb means 111 which project laterally outwardly from the body towards the inner end of the ground member. When the alternative ground contact member is inserted between the sheath 101 and the resilient cover 17, it can be seen that the barb means 109 and 111 would tend to grip the cover if attempts were made to withdraw the ground member from between the cover and sheath.

I claim:

1. An apparatus for connecting a cable to an item, the apparatus comprising:

(a) a body having aligned first and second portions having respective outer peripheries, the first and second portions having axially aligned openings for receiving the cable passed therethrough, the first portion having a plurality of flexible fingers disposed on the periphery thereof to extend around the cable, (b) an elastic cover assembly positionable on the body to enclose at least the fingers of the first portion, the cover assembly comprising an elastic sleeve and a hollow core member, the sleeve initially being supported in a stretched condition on the hollow core member which is removeable to permit the sleeve to collapse onto the fingers.

2. An apparatus as claimed in claim 1 in which:

(a) the fingers are disposed generally parallel to an axis of the openings and are circumferentially spaced apart around the periphery of the first portion sufficiently to provide clearance therebetween, which clearance permits the fingers to deflect inwardly to engage the cable.

3. An apparatus as claimed in claim 1 further including:

(a) the body has a third portion disposed between the first and second portions thereof, the third portion having an axially aligned opening to receive the cable passed therethrough, and means to apply torque to the body.

4. An apparatus as claimed in claim 2 in which:

(a) the fingers have inner faces, and at least one finger has cable engaging means for enhancing gripping of the cable, the cable engaging means projecting inwardly from the inner surface of the finger, (c) the elastic sleeve, when installed on the cable after removal of the hollow core member from the elastic core assembly, forces the cable engaging means against the cable.

5. An apparatus as claimed in claim 4 in which:

(a) the cable engaging means are located on a plurality of fingers adjacent outer ends of the fingers.

6. An apparatus as claimed in claim 4 in which:

(a) the cable engaging means include barb means facing inwardly from positions adjacent outer ends of the fingers.

7. An apparatus as claimed in claim 2 in which:

(a) the fingers have outer surfaces, and at least one finger has sleeve engaging means for enhancing gripping of the sleeve, the sleeve engaging means projecting outwardly from the outer surface of the finger, (b) the sleeve, when installed on the cable after removal of the hollow core member from the elastic cover assembly, being deformed by the sleeve engaging means.

8. An apparatus as claimed in claim 1 in which:

(a) the fingers have inner and outer ends, (b) the first portion of the body includes a shoulder disposed generally adjacent the inner ends of the fingers, the shoulder cooperating with the elastic sleeve when installed to deform the sleeve to enhance grip between the sleeve and the body.

9. An apparatus as claimed in claim 8 in which:

(a) the first portion of the body has a rim portion and a waist portion, and the fingers extend from the rim portion, (b) the waist portion has a diameter smaller than diameter of the rim portion to define the shoulder therebetween, the waist portion being adapted to receive an end portion of the elastic sleeve therein to enhance gripping between the sleeve and the body portion.

10. A method of connecting a cable to an item having an opening, the method comprising:

(a) providing a body with aligned first and second portions having respective outer peripheries, the first and second portions having axially aligned openings for receiving the cable therethrough, the first portion having a plurality of flexible fingers disposed on the periphery thereof, (b) passing the second portion of the body through the opening of the item, and securing the body to the item, (c) positioning an elastic cover assembly so as to enclose at least the fingers of the first portion, the cover assembly comprising an elastic sleeve and a hollow core member, the sleeve initially being supported in a stretched condition on the hollow core member, (d) passing the cable through the cover assembly and the openings of the first and second portions so that the cable extends between the fingers, (e) removing the hollow core member to permit the sleeve to collapse onto the first portion, thereby forcing the fingers against the cable.

11. A method as claimed in claim 10 further characterized by:

(a) progressively collapsing the core starting at a position remote from the outer ends of the fingers, so that the core collapses sequentially onto the fingers in a direction towards the outer ends of the fingers.

12. A method as claimed in claim 10 further characterized by:

(a) providing cable engaging means on an inner surface of at least one of the fingers, (b) permitting the sleeve to collapse onto the fingers to force the cable engaging means against the cable.

13. A method as claimed in claim 10 further characterized by:

(a) providing sleeve engaging means on an outer surface of at least one of the fingers, (b) permitting the sleeve to collapse onto the engaging means to deform the sleeve so as to enhance grip between the sleeve and the fingers.

14. A method as claimed in claim 10 further characterized by:

(a) prior to removing the core member, inserting a generally rigid contact means between a metallic sheath and a flexible sheath of the cable to provide an electrical grounding contact for the metallic sheath.

15. A combination of an item having an opening, a cable passing through the opening, and an apparatus cooperating with the item and cable for connecting the cable to the item, the apparatus including:

(a) a body having aligned first and second portions having respective outer peripheries, the first and second portions having axially aligned openings, the cable passing through the openings, the first portion of the body having a plurality of flexible fingers disposed on the periphery thereof to extend around the cable, the second portion passing through the opening of the item and being secured to the item, (b) an elastic sleeve enclosing at least the fingers and applying an inwards force to the fingers, so that the fingers are forced against the cable.

16. A combination as claimed in claim 15 in which:
(a) at least one of the fingers has cable engaging cable engaging means projecting inwardly from an inner surface of the finger,
(b) the elastic sleeve encloses the fingers and forces the cable engaging means against the cable and extends from the fingers along the cable to enclose an adjacent portion of the cable to improve sealing therewith,
(c) at least one of the fingers has sleeve engaging means for enhancing gripping of the sleeve, the sleeve engaging means projecting outwardly from an outer surface of the finger,
(d) the sleeve closely conforming to the sleeve engaging means to be deformed thereby to enhance gripping of the sleeve on the fingers.

17. A combination as claimed in claim 15 in which:
(a) the first portion of the body has a rim portion and a waist portion, and the fingers extend from the rim portion,
(b) the waist portion has a diameter smaller than the rim portion to define a shoulder therebetween,
(c) the elastic sleeve has an end portion received in the waist portion in a reduced stretched condition, and passes over the shoulder onto the rim portion in an increased stretched condition, thus deforming the sleeve and enhancing grip of the sleeve on the first portion.

18. A combination as claimed in claim 15 further characterized by:
(a) the cable having a metallic sheath and a flexible sheath disposed concentrically therewith,
(b) a generally rigid contact means disposed between the sheaths and held against the metallic sheath to provide an electrical grounding contact for the metallic sheath.

19. An apparatus to assist in connecting a cable to an item, the apparatus comprising:
(a) a body having aligned first and second portions having respective outer peripheries, the first and second portions having axially aligned openings for receiving the cable passed therethrough,
(b) the first portion of the body having a plurality of flexible fingers disposed on the periphery thereof to extend around the cable, the fingers being disposed generally parallel to an axis of the opening and circumferentially spaced apart around the periphery of the first portion sufficiently to provide clearance therebetween, the fingers having barb means facing inwardly from positions adjacent outer ends of the fingers and projections extending outwardly from outer surfaces of the fingers,
(c) the first portion of the body also having a rim portion and a waist portion, the fingers extending from the rim portion, the waist portion having a diameter smaller than diameter of the rim portion to define a shoulder therebetween,
(d) the second portion of the body being screw-threaded for securing the body to an item.

* * * * *